United States Patent
Higley et al.

(10) Patent No.: US 11,860,426 B2
(45) Date of Patent: Jan. 2, 2024

(54) DUST PLUG FOR ADAPTER PRE-POPULATED WITH MPO HOUSING

(71) Applicant: US Conec, Ltd, Hickory, NC (US)

(72) Inventors: Jason Higley, Hickory, NC (US); Mitchell Cloud, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 231 days.

(21) Appl. No.: 17/231,829

(22) Filed: Apr. 15, 2021

(65) Prior Publication Data

US 2021/0325613 A1    Oct. 21, 2021

Related U.S. Application Data

(63) Continuation-in-part of application No. 17/227,750, filed on Apr. 12, 2021.

(60) Provisional application No. 63/010,216, filed on Apr. 15, 2020, provisional application No. 63/075,335, filed on Sep. 8, 2020.

(51) Int. Cl.
  *G02B 6/00* (2006.01)
  *G02B 6/38* (2006.01)
(52) U.S. Cl.
  CPC ......... *G02B 6/3849* (2013.01); *G02B 6/3825* (2013.01); *G02B 6/3831* (2013.01)

(58) Field of Classification Search
  CPC .. G02B 6/3849; G02B 6/3825; G02B 6/3831; G02B 6/3893; G02B 6/00
  See application file for complete search history.

(56) References Cited

U.S. PATENT DOCUMENTS

| | | | |
|---|---|---|---|
| 9,684,138 B2 * | 6/2017 | Lu | G02B 6/3889 |
| 10,175,427 B2 | 1/2019 | Cloud et al. | |
| D888,671 S | 6/2020 | Cloud et al. | |
| 2014/0147080 A1 * | 5/2014 | Lambourn | G02B 6/4201 439/490 |
| 2018/0095226 A1 * | 4/2018 | Watanabe | G02B 6/3885 |
| 2021/0181433 A1 | 6/2021 | Cloud et al. | |

* cited by examiner

*Primary Examiner* — Jennifer Doan (74) *Attorney, Agent, or Firm* — Michael L Leetzow PLLC; Shubhrangshu Sengupta (57) ABSTRACT

A dust plug for use in a pre-populated adapters has a main body having a top wall, a bottom wall, and two opposing side walls extending between the top wall and bottom wall. The dust plug also includes at least one pair of latches in a front portion of the main body and each of the at least one pair of latches may have an increased thickness at a forward end thereof. The area of increased thickness is sized to engage a receptacle in an inner surface of the housing when the dust plug is attached to the housing. Other versions contemplate not having the increased thickness. The dust plug preferably includes a grip at the back end.

19 Claims, 9 Drawing Sheets

DUST PLUG FOR ADAPTER PRE-POPULATED WITH MPO HOUSING

REFERENCE TO RELATED CASE

This application claims priority under 35 U.S.C. § 119 (e) to U.S. provisional application No. 63/075,335 filed on Sep. 8, 2020, and to U.S. Provisional Application No. 63/010,216, titled "AN INTERCONNECT SYSTEM AND METHODS OF INSTALLING THE SAME," filed Apr. 15, 2020; and under 35 U.S.C. § 120 to U.S. patent application Ser. No. 17/227,750, filed on Apr. 12, 2021, the contents of which are hereby incorporated by reference in their entirety.

BACKGROUND OF THE INVENTION

Interconnect systems in high-density environments, such as in hyperscale data centers, utilize a fiber optic cable being pre-terminated with some of the components of optical connectors, and at least one adapter panel having adapters pre-populated (i.e., pre-installed) with other components of those optical connectors. The components terminating the fiber optic cable and the components pre-installed on the adapters can be combined during installation of the interconnect system, resulting in functionable optical connectors populating the adapter panel(s). The combining can occur without removing the components that are pre-installed on the adapters. For multi-fiber connections using, e.g., an MT-ferrule, these pre-installed components include a housing and an outer sleeve. The pre-installed housing can hold the ferrule with the terminated fibers therein, and the outer sleeve can slide over the housing so that adapter latches can attach to the housing. The adapter itself is attached to an adapter panel having a multitude of such adapters. The MT-ferrule can be pushed into the housing from one side of the adapter (field-termination side), e.g., using a ferrule push, to complete the connection. Typically, on the opposite side of the adapter, another MPO connector may be present. This setup is described in the U.S. Provisional Application No. 63/010,216, titled "AN INTERCONNECT SYSTEM AND METHODS OF INSTALLING THE SAME," filed Apr. 15, 2020 ("the '216 application").

When the adapter panel pre-populated with the housing and outer sleeve is not in use, the housing and the adapter on the field termination side can be exposed to dust and debris, contaminating the components. To prevent the dust and debris from entering the system, a dust plug is provided to cover an opening of the housing when the fiber optic ferrule is not inserted therein. On a side opposite the housing and the sleeve, i.e., the side on the other side of the panel, a regular MPO connector may be removably attached. When the MPO connector on that side is not present, the adapter may be closed off using an MPO side adapter dust plug, which is standard in the industry. A dust plug for the housing and outer sleeve is provided.

SUMMARY OF THE INVENTION

According to one aspect, the present invention is directed to a dust plug for a pre-populated adapter having a housing and a sleeve, that includes a main body having a top wall, a bottom wall, and two opposing side walls extending between the top wall and bottom wall, and at least one pair of latches in a front portion of the main body and each of the at least one pair of latches having an increased thickness at a forward end thereof, wherein the increased thickness is sized to engage a receptacle in an inner surface of the housing when the dust plug is attached to the housing.

In some embodiments, the pair of latches further comprises a pair of vertical latches and a pair of horizontal latches, the pair of vertical latches oriented perpendicular to the pair of horizontal latches at the front portion of the main body.

In some embodiments, there is a shoulder at least partially surrounding the main body to form a stop surface configured to engage the housing and prevent further forward movement of the dust plug relative to the housing.

In some embodiments, there is a grip on a rearmost portion of the dust plug.

In some embodiments, the increased thickness comprises a plurality of bumps.

In yet another aspect, there is an interconnect system having at least one adapter panel for managing interconnections, each adapter panel including a plurality of adapters, the system including a plurality of connector housings, each of the plurality of connector housings attached to and pre-installed onto a respective adapter of the plurality of adapters, a plurality of dust plugs, each of the plurality of dust plugs attachable to a respective one of the plurality of connector housings, each of the plurality of dust plugs having a main body with a top wall, a bottom wall, and two opposing side walls disposed between the top wall and bottom wall, and at least one pair of latches in a front portion of the main body and having an increased thickness at a forward end thereof, the increased thickness is sized to engage a receptacle in an inner surface of a respective housing when the dust plug is inserted into the housing.

In some embodiments, the at least one pair of latches comprises two pair of latches, a pair of vertical latches and a pair of horizontal latches, the pair of vertical latches oriented perpendicular to the pair of horizontal latches at the front portion of the main body.

In some embodiments, there is a shoulder at least partially surrounding the main body to form a stop surface configured to engage the housing and prevent further forward movement of the dust plug relative to the housing.

In yet another aspect, there is a dust plug for a pre-populated adapter having a housing and a sleeve that includes a main body having a top wall, a bottom wall, and two opposing side walls extending between the top wall and bottom wall, and at least one pair of latches in a front portion of the main body, wherein the at least one pair of latches engages an inner surface of the housing when the dust plug is attached to the housing.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
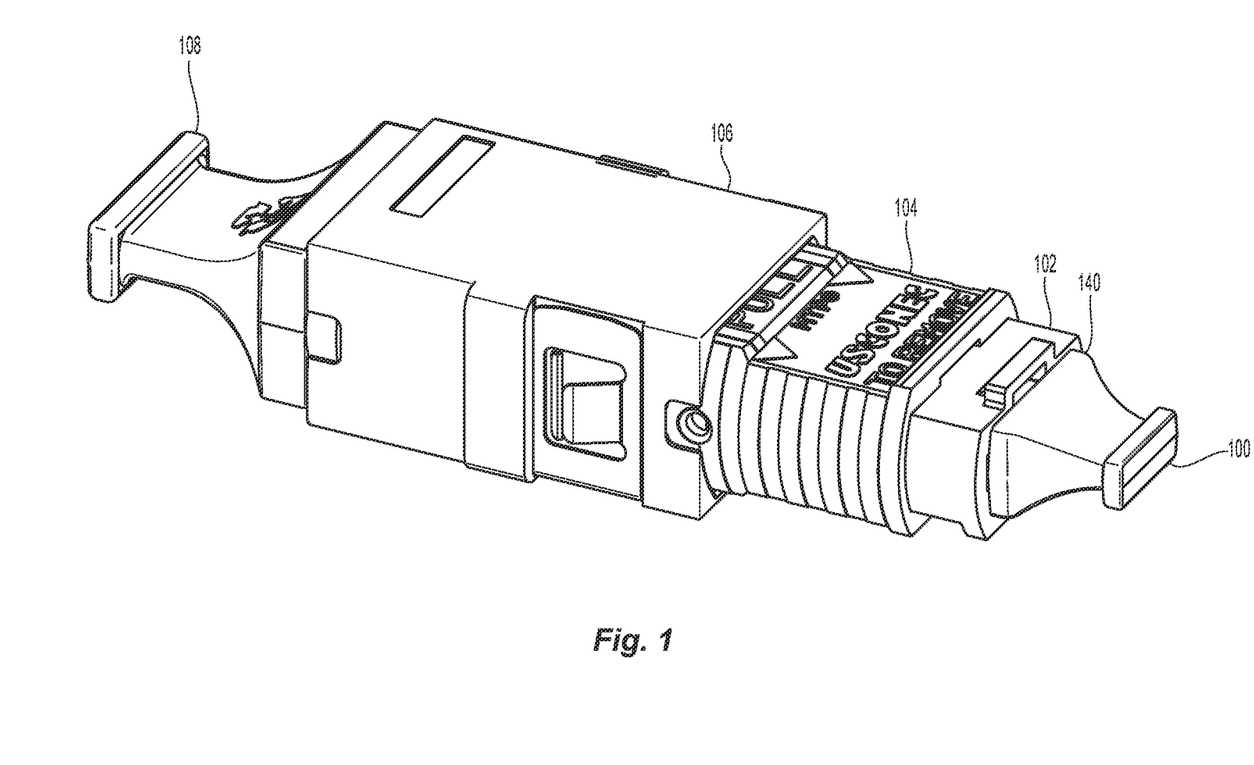
FIG. 1 is a side perspective view of one embodiment of a dust plug inserted into a housing installed into an adapter according to the present invention.
Figure 2:
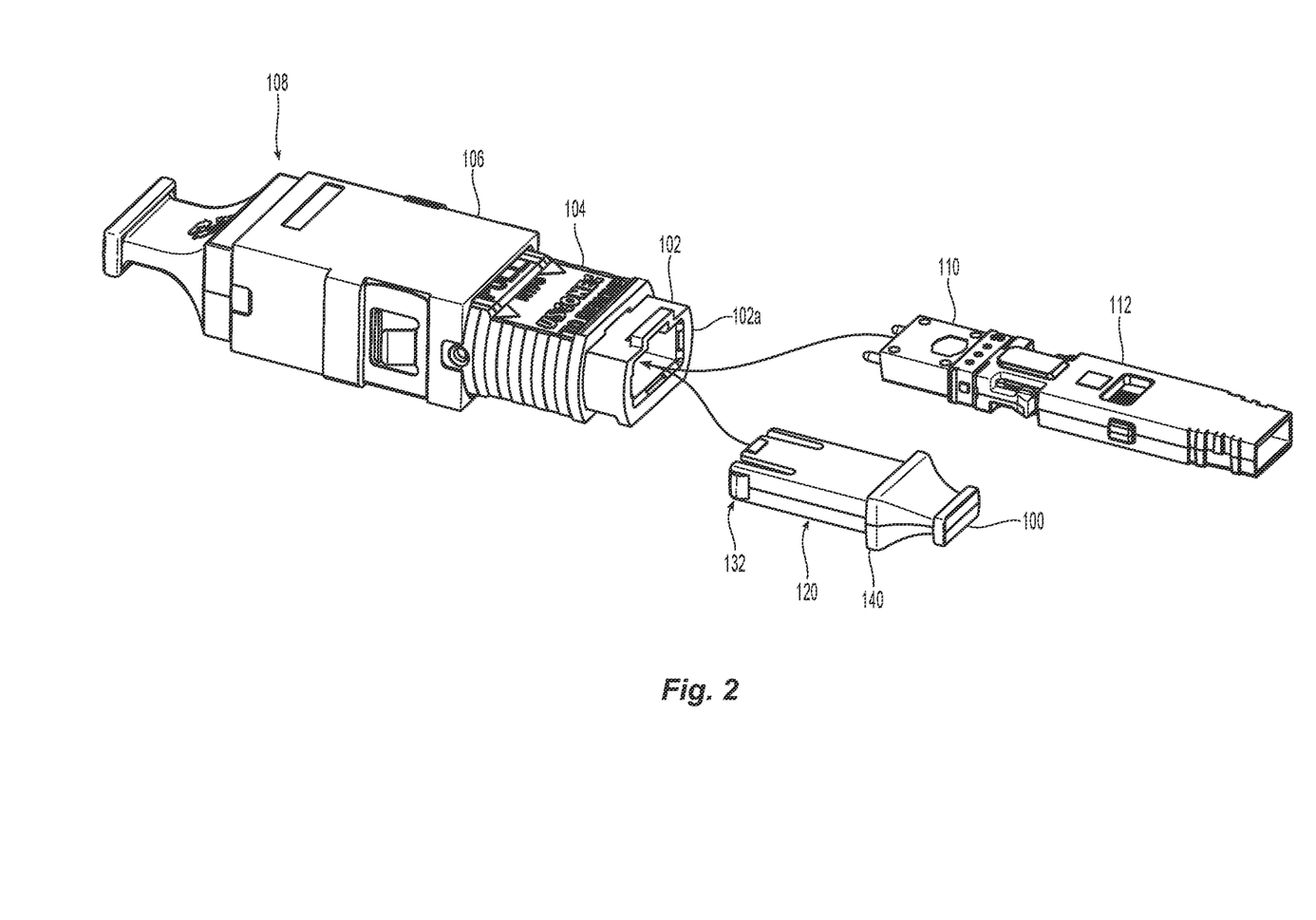
FIG. 2 is a side perspective view the dust plug and a fiber optic ferrule that can be inserted into the housing in FIG. 1.

Illustrated in FIGS. 1 and 2 is one embodiment of a dust plug 100 according to the present invention. The dust plug 100 is illustrated in FIG. 1 as being inserted into a housing 102, along with a sleeve 104, all of which are inserted into one side of an adapter 106. On the other side of the adapter 106 is an MPO side adapter dust plug 108. As noted above, the dust plug 108 is known. Alternatively, there may also be a regular MPO connector that may be removably attached to the adapter 106. The adapter 106 is installed in a panel that receives a number of these adapters 106. It should also be noted that the housing 102 and the sleeve 104 are not meant to be removed from the adapter 106, but may be if so desired. The housing 102 and the sleeve 104 are able to receive either a fiber optic ferrule 110 and a ferrule push 112 or a dust plug 100. See FIG. 2. The ferrule push is described in Applicant's co-pending application Ser. No. 17/251,076, filed on Dec. 20, 2020 and entitled "Ferrule Push." The contents of this co-pending application are incorporated herein by reference. The presence of the either the fiber optic ferrule 110 and a ferrule push 112 or the dust plug 100 prevents dust, debris and other contaminants from entering into the adapter 106 through the housing 102 and the sleeve 104.

The dust plug 100 will now be discussed with reference to FIGS. 3-5 and 6-9. The dust plug 100 has a main body 120, a top wall 122, a bottom wall 124, and two opposing side walls 126, 128 extending between the top wall 122 and bottom wall 124. The dust plug 100 also has at least one pair of latches 130 in a front portion 132 of the main body 120.

Applicant notes that the term "front" or "forward" means that direction where the fiber optic ferrule would meet with another fiber optic ferrule or device, while the term "rear" or "rearward" is used to mean the direction from which the optical fibers enter into the fiber-optic ferrule or fiber optic connector. In the present application, the dust plug 100 will therefore have a front and a rear, the front will be inserted into the housing 102 and the sleeve 104 first. Thus, in FIG. 3, the "front" of the dust plug 100 (and also a fiber optic ferrule or connector) is on the left side of the figure and pointing out of the figure. The "rear" or "back" is that part of the dust plug 100 (or fiber optic connector) is on the right side of the page and "rearward" and "backward" is toward the right and into the page.

Figure 3:
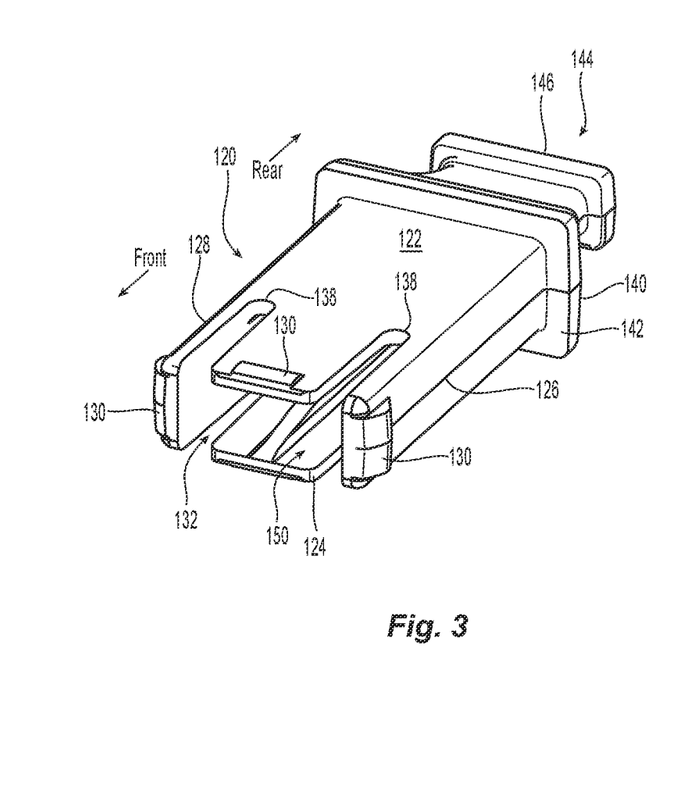
FIG. 3 is a perspective view from the upper right of the dust plug of FIG. 2.
Figure 4:
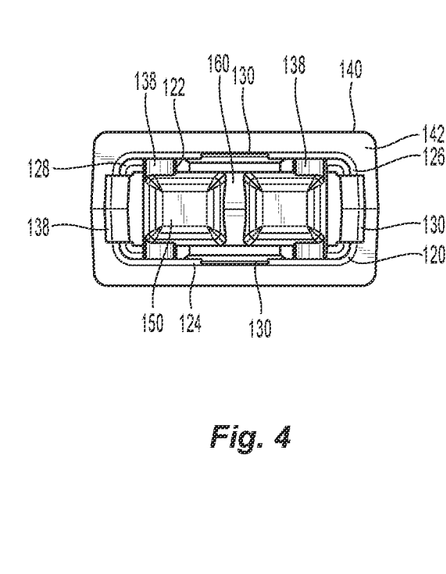
FIG. 4 is an end view of the dust plug in FIG. 2.
Figure 5:
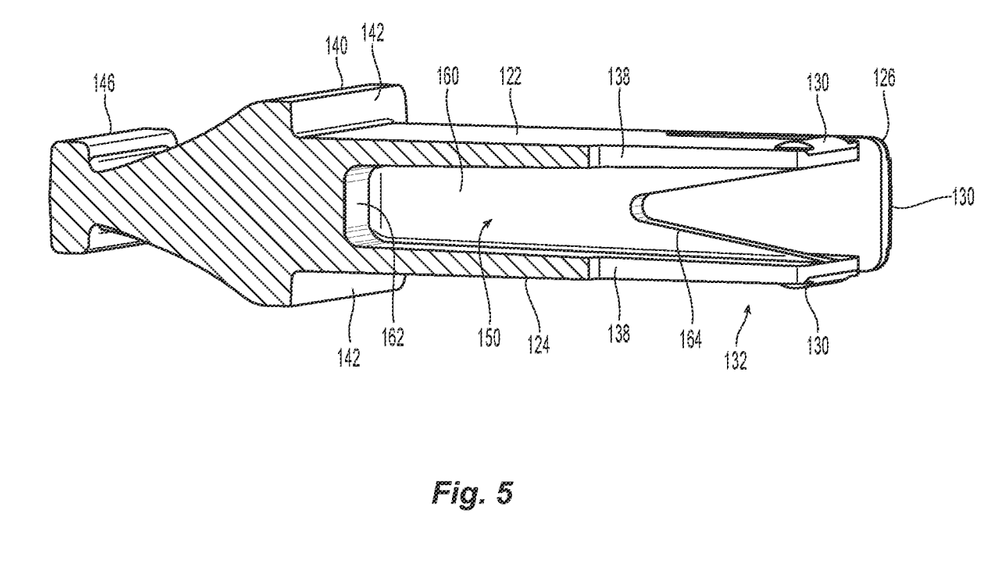
FIG. 5 is a cross sectional view of the dust plug in FIG. 2.

The latches 130 could be bumps or protrusions as illustrated best in FIGS. 3 and 5. The latches 130 need not cover the entirety of the front portion 132 of the main body 120. However, there may also be a thickening of the front portion 132 to engage a receptacle 182/176 on an inner surface 136 of the housing 102 as detailed more below. The latches 130 may also be more than one bump or protrusion, i.e., two or three bumps.

The dust plug 100 has two cut-outs or gaps 138 in the top wall 122 and the bottom wall 124 at the front portion 132, thereby separating the top wall 122 and the bottom wall 124 from the two opposing side walls 126, 128. This means that the top wall 122 and the bottom wall 124 are cantilevered. It also means that the two opposing side walls 126, 128 are also cantilevered, allowing all of the walls to flex when a force is applied. Typically, the force would be applied from the outside of the dust plug 100.

It should be noted that there could be cut-outs or gaps in the two opposing side walls 126, 128 rather than in the top wall 122 and the bottom wall 124 as illustrated in the figures. This would also provide the cantilevered effect for the front portion 132 of the main body 120. The latches 130 on the side walls 126, 128 are preferably larger and thicker than those on the top wall 122 and the bottom wall 124, but they could all be of the same size. Additionally, the latches 130 on the side walls 126, 128 could also be simply an increased thickness at the front portion 132.

The main body 120 preferably has a shoulder 140 that extends around the circumference of the main body 120. See also, FIG. 5. However, the shoulder 140 could only extend around a portion of the main body 120, have multiple sections, etc. The shoulder 140 provides a stop for inserting the dust plug 100 into the housing 102. See FIG. 2. The shoulder 140 has a forward facing surface 142 that engages the rearward facing surface 102a of the housing 102. See FIG. 2. This prevents the dust plug 100 from being inserted too far relative to the housing 102. Preferably the latches 130 are positioned on the main body 120 so that they engage a receptacle or inner surface of the housing 102 as described below with reference to FIGS. 7-9.

At the rear 144 of the main body 120 is a grip 146. The grip 146 is preferably used to pull the dust plug 100 from the housing 102 and to insert the dust plug into the housing 102. The grip 146 has a rectangular shape, but could have any configuration to allow a user to grasp the dust plug 100. While there may be other structures behind the grip 146, it is preferred that the grip 146 be the rearmost structure on the dust plug 100.

The top wall 122 and the bottom wall 124 and the two opposing side walls 126, 128 form an opening 150 in the main body 120. The opening 150 provides an area for the top wall 122, the bottom wall 124, and the two opposing side walls 126, 128 to flex into when a force is applied to the outside of the dust plug 100. The opening 150 may also include a spine 160. The spine 160 provides for strength, support, and rigidity to the top wall 122 and the bottom wall 124. That is, due to the spine 160, the dust plug 100 does not collapse when external forces are applied thereupon, for example, during insertion or removal from the housing 102. The spine 160 preferably extends from a back wall 162 of the opening towards the front portion 132. The spine 160 as illustrated in FIGS. 3, 5 and 7-8 show the spine 160 extending to the very front of the main body 120. However, the spine 160 could end anywhere along the length of the opening 150. Additionally, the spine 160 has an opening 164 that has a v-shape, with the vertex oriented toward the back wall 162. The shape of the opening 164 could take any applicable form, e.g., rectangular, oval, circular, etc. The spine 160 is preferably arranged in the middle of the opening between the two side walls, 126, 128, but could be located closer to one of the side walls if so desired. There may also be other openings in the spine 160, for example, at the back wall 162, or between the back wall 162 and the front portion 132. The thickness of the spine 160 may also vary from that shown, depending on the length and positioning of the spine 160 in the opening 150. Further, there may be two or more spines.

Figure 6:
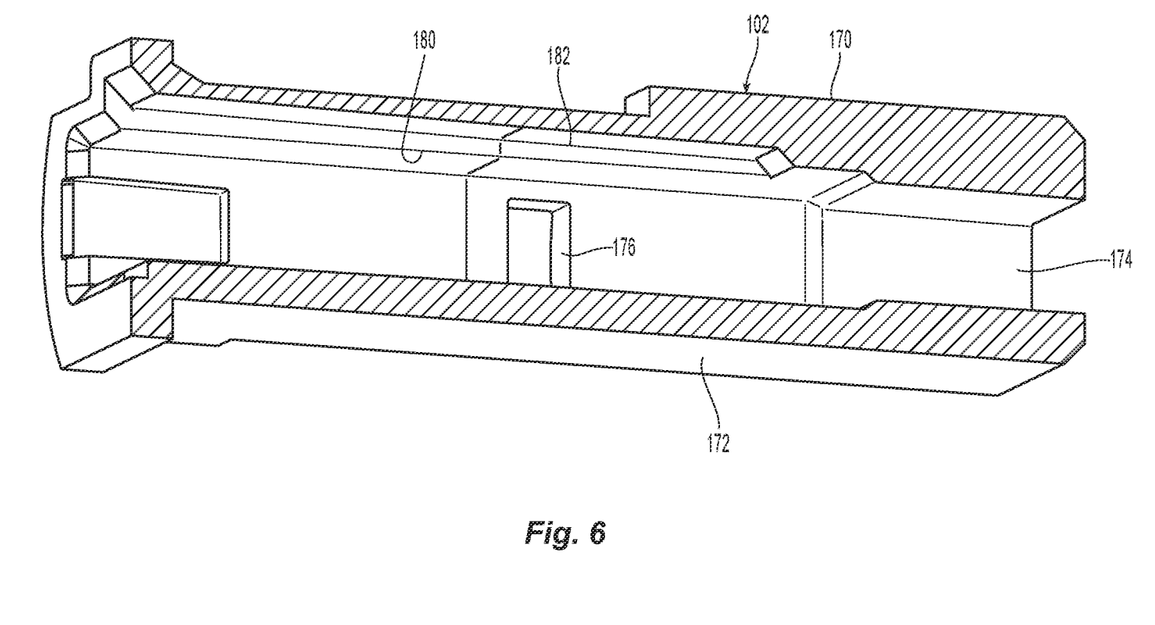
FIG. 6 is a cross sectional view of the housing in FIG. 2 showing the internal groove for the dust plug.

Turning to FIG. 6, there is a cross section of the housing 102. The housing 102 has a top wall 170 and a bottom wall 172, which are joined by side walls 174 (the other side wall is not shown in this cross section view, although it has the same construction). The side wall 174 has a receptacle 176 in the side wall 174 (and the other side wall would also have the same receptacle see also FIGS. 7 and 8. The receptacle 176 receives the latch 130 on the side wall 126. While the receptacle 176 is illustrated as an opening through the side wall 172, it may only be a depression.

The walls 170, 172, 174 of the housing 102 form an opening 178, into which the dust plug 100 or the fiber optic ferrule 110 and a ferrule push 112 can be inserted. In an inner surface 180 of the top wall 170 (and in communication with the opening 178) of the housing 102 is a groove or recessed portion 182. This groove 182 may function as a key way for the fiber optic ferrule 110 and a ferrule push 112. It is also may receive the latch 130 from the top wall 122 of the dust plug 100.

Figure 7:
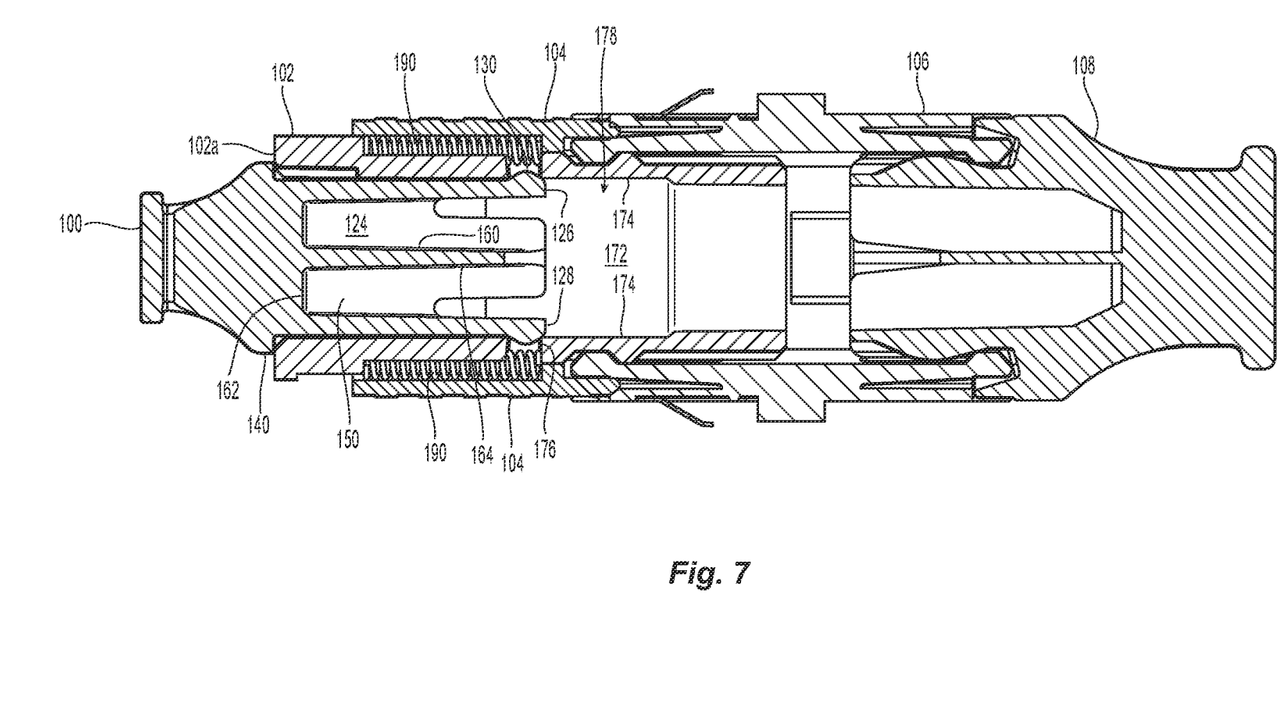
FIG. 7 is a cross sectional view of the adapter, outer sleeve, housing, dust plug according to the present invention, and the standard MPO side adapter dust plug in FIG. 1.
Figure 8:
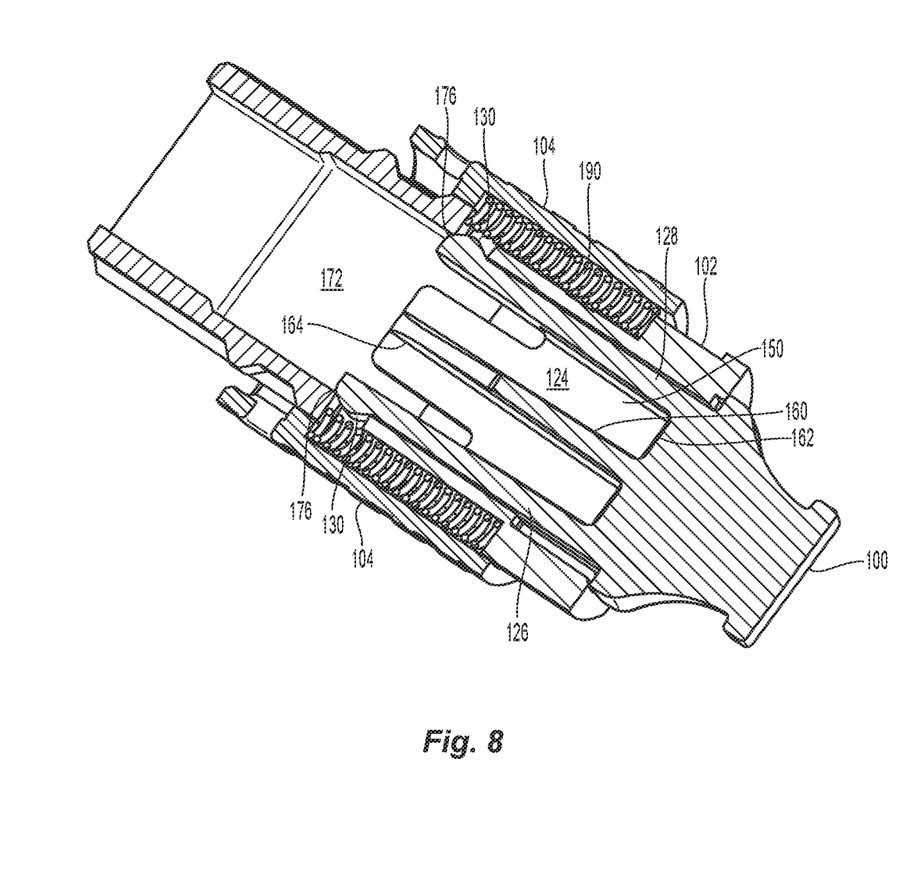
FIG. 8 is a cross section view of the dust plug, housing and outer sleeve in FIG. 2.

With reference to FIGS. 7-10, the combination of the dust plug 100 with the adapter 106 and the housing 102 with the sleeve 104 will be discussed. On the right side of FIG. 7 is the an MPO side adapter dust plug 108 and it has been inserted into the adapter 106. In the typical installation of these adapters, there are a number of the adapters 106 that are inserted into a number of panels to form the interconnect system. On the left side of the adapter 106 is a sleeve 104 and a housing 102. The adapter 106 engages a portion of the housing 102 to retain the sleeve 104 and the housing 102 therein. The sleeve 104 is slidingly engaging the housing 102, with a spring 190 disposed between the two. The dust plug 100 is then inserted into the housing 102. As the dust plug 100 is inserted into the housing 102, the latches 130 are flexed inward and engage the inner surface of the opening 150. The inward flexing occurs due to a forward facing chamfer on the bump of each of the latches 130. See, e.g., FIG. 5. Once the dust plug 100 is fully inserted, the shoulder 140 engages the rearward facing surface 102a of the housing 102. The latches 130 on the side walls 126, 128 engage the receptacles 176 in the housing 102. This engagement reduces the chance of the dust plug 100 from falling out of the housing 102. The latches 130 on the top wall 122 and the bottom wall 124 frictionally engage the inner surface of the top wall 170 and the bottom wall 172. See FIG. 8 showing only the dust plug 100 with the housing 102 and the sleeve 104.

Figure 9:
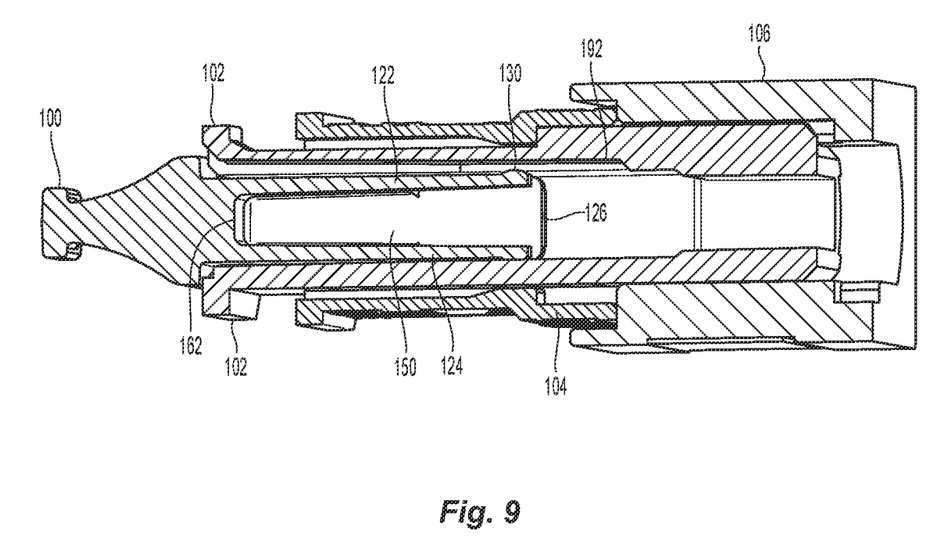
FIG. 9 is a cross section view of the dust plug, housing and outer sleeve in FIG. 2 at a 90 degree angle from FIG. 8.
Figure 10:
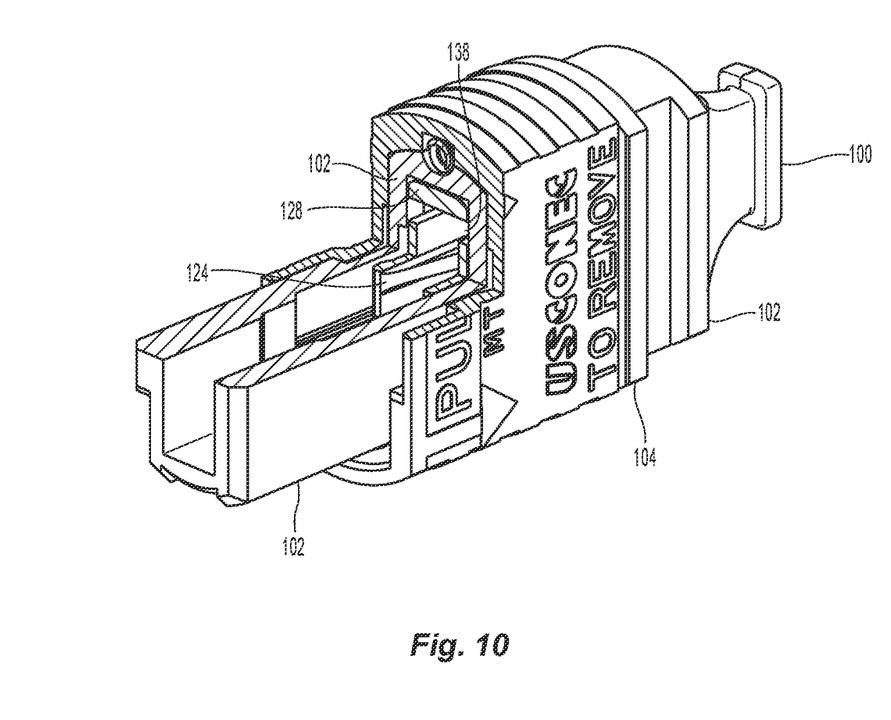
FIG. 10 is a partial cross section view of the dust plug, housing and outer sleeve in FIG. 1.

There may or may not be receptacles similar to receptacles 176 in the top wall 170 and the bottom wall 172. However, as noted above, there may be a groove 182 in the housing 102. See FIG. 9 showing the housing 102 with the groove 182 therein. In that case, the side walls 126, 128 and the bottom wall 124 would engage the inside of the housing 102, with the latch 130 on the bottom wall 124 frictionally engaging the housing. The dust plug 100 does not contact any of the outer surfaces of the housing 100, except for the rearward facing surface 102a (in FIG. 2, for example). Likewise, the dust plug 100 does not contact any portion of the sleeve 104 in the pre-populated adapter 106.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A dust plug for a pre-populated adapter having a housing and a sleeve, comprising:
   a main body having a top wall, a bottom wall, and two opposing side walls extending between the top wall and bottom wall; and
   at least one pair of latches in a front portion of the main body and each of the at least one pair of latches having an increased thickness at a forward end thereof,
   wherein the increased thickness is sized to engage a receptacle in an inner surface of the housing when the dust plug is attached to the housing.

2. The dust plug according to claim 1, wherein the at least one pair of latches further comprises a pair of vertical latches and a pair of horizontal latches, the pair of vertical latches oriented perpendicular to the pair of horizontal latches at the front portion of the main body.

3. The dust plug according to claim 1, further comprising a shoulder at least partially surrounding the main body to form a stop surface configured to engage the housing and prevent further forward movement of the dust plug relative to the housing.

4. The dust plug according to claim 1, further comprising a grip on a rearmost portion of the dust plug.

5. The dust plug according to claim 1, wherein the increased thickness is a bump.

6. The dust plug according to claim 1, wherein the increased thickness comprises a plurality of bumps.

7. The dust plug according to claim 1, further comprising a spine disposed within an opening in the main body and extending from the top wall to the bottom wall.

8. The dust plug according to claim 7, wherein the spine has a cut-out at a forward portion thereof.

9. The dust plug according to claim 8, wherein the cut-out has a v-shape.

10. The dust plug according to claim 1, wherein there is a gap between a portion of the top wall and each of the side walls and a gap between a portion of the bottom wall and the side walls.

11. The dust plug according to claim 10, wherein the top wall and the bottom wall are at least partially cantilevered.

12. An interconnect system having at least one adapter panel for managing interconnections, each adapter panel including a plurality of adapters, comprising:
   a plurality of connector housings, each of the plurality of connector housings attached to and pre-installed onto a respective adapter of the plurality of adapters;
   a plurality of dust plugs, each of the plurality of dust plugs attachable to a respective one of the plurality of connector housings, each of the plurality of dust plugs having a main body with a top wall, a bottom wall, and two opposing side walls disposed between the top wall and bottom wall; and
   at least one pair of latches in a front portion of the main body and having an increased thickness at a forward end thereof, the increased thickness is sized to engage a receptacle in an inner surface of a respective housing when the dust plug is inserted into the housing.

13. The interconnect system according to claim 12, wherein the at least one pair of latches comprises two pair of latches, a pair of vertical latches and a pair of horizontal latches, the pair of vertical latches oriented perpendicular to the pair of horizontal latches at the front portion of the main body.

14. The interconnect systems according to claim 12, further comprising a shoulder at least partially surrounding the main body to form a stop surface configured to engage the housing and prevent further forward movement of the dust plug relative to the housing.

15. The interconnect system according to claim 12, further comprising a grip on a rearmost portion of the dust plug.

16. The interconnect system according to claim 12, further comprising a spine disposed within an opening in the main body and extending from the top wall to the bottom wall.

17. The interconnect system according to claim 16, wherein the spine has a cut-out at a forward portion thereof.

18. The interconnect system according to claim 12, wherein there is a gap between a portion of the top wall and each of the side walls and a gap between a portion of the bottom wall and the side walls.

19. A dust plug for a pre-populated adapter having a housing and a sleeve, comprising:

a main body having a top wall, a bottom wall, and two opposing side walls extending between the top wall and bottom wall; and at least one pair of latches in a front portion of the main body, wherein the at least one pair of latches engages an inner surface of the housing when the dust plug is attached to the housing.

* * * * *